United States Patent
Muntz

[19]

[11] Patent Number: 6,141,348
[45] Date of Patent: Oct. 31, 2000

[54] CONSTANT-TIME PROGRAMMABLE FIELD EXTRACTION SYSTEM AND METHOD

[75] Inventor: Gary S. Muntz, Lexington, Mass.

[73] Assignee: Cisco Technology, Inc., San Jose, Calif.

[21] Appl. No.: 08/918,080

[22] Filed: Aug. 25, 1997

[51] Int. Cl.⁷ .................................................. H04Q 11/04
[52] U.S. Cl. .......................... 370/392; 370/465; 709/213; 711/202
[58] Field of Search ..................................... 370/389, 392, 370/393, 394, 400, 401, 465, 471, 474; 709/212, 213, 214, 215; 711/1, 101, 104, 105, 108, 109, 202

[56] References Cited

U.S. PATENT DOCUMENTS

| | | | |
|---|---|---|---|
| 5,119,481 | 6/1992 | Frank et al. | 395/325 |
| 5,274,635 | 12/1993 | Rahman et al. | 370/60 |
| 5,394,394 | 2/1995 | Crowther et al. | 370/60 |
| 5,430,715 | 7/1995 | Corbalis et al. | 370/54 |
| 5,459,723 | 10/1995 | Thor | 370/60 |
| 5,684,954 | 11/1997 | Kaiserswerth et al. | 370/393 |
| 5,907,682 | 5/1999 | Miyazawa | 395/200.6 |

*Primary Examiner*—Alpus H. Hsu
*Attorney, Agent, or Firm*—Cesari and McKenna, LLP

[57] ABSTRACT

A field extraction system quickly extracts information from arbitrary fields of a data packet transferred among entities of a computer network. The system includes a field extractor having synchronously operated hardware circuitry that is programmable to extract the contents of a field from the packet and then to interpret these extracted contents. The programmable hardware-based field extraction system extracts the contents of a field within a fixed amount of time while also providing the flexibility needed to adapt to changing header standards so that information can be extracted from arbitrary fields of, e.g., a header of the packet.

23 Claims, 3 Drawing Sheets

CONSTANT-TIME PROGRAMMABLE FIELD EXTRACTION SYSTEM AND METHOD

FIELD OF THE INVENTION

This invention relates generally to communication among entities of a data communications network and, more specifically, to extracting and interpreting fields of data packets transmitted in a data communications network.

BACKGROUND OF THE INVENTION

In a data communications network, networking equipment is relied upon to extract and interpret certain fields of data packets transferred among entities of the network. To facilitate the transmission of data packets over the network, layer 2 or layer 3 processing elements, such as routers, Ethernet switches and ATM switches utilize networking equipment to read and interpret the header fields of each data packet that it receives before forwarding the data packet to a proper destination. In particular, every data packet handled by networking equipment at ISO layer 2 or higher of the router requires that certain fields be extracted from the header of the data packet.

The data packet headers typically comprise many fields, some of which need not be read when performing certain functions on the data packet. For example, it may only be necessary to read the header field containing the destination address of the packet when transmitting the data packet over the network. A router addresses this problem by field extraction, or parsing, where only the header fields that are necessary for a particular application are extracted. In one approach to this problem, the router is programmed (in software) by conventional shift and mask techniques to extract the desired fields of the header. Because the header comprises many fields having various sizes and locations, it is clear that standards play an important role for defining the fields so that they can be read or extracted with knowledge as to their content.

An example for extracting fields by the conventional shift and mask technique will be described with reference to FIG. 1 and the following software instructions:

1) READ Location 2—Reg1
2) AND Reg1, 0xFF—Reg2
3) AND Reg1, 0xF00—Reg3
4) SHIFT Reg3 Left 8
5) SHIFT Reg1 Left 12—Reg4

In FIG. 1, an exemplary header for a data packet with generic header fields labeled A, B, C, D, E, F, G and H is illustrated. Field A has a length of 32 bits, field B has a length of 8 bits, fields C and D are 4 bits in length, field E is 16 bits in length, field F is 3 bits in length, field G is 4 bits in length, and field H has a length of 1 bit. To extract fields B, C, and D, the location defined by address 2 is read and loaded into register 1 at instruction 1. The bits corresponding to the C and D fields are then masked by the AND instruction 2 so that only the bits corresponding to the B field remain in register 2. Thus, the contents of field B have been extracted and placed in the positions corresponding to the least significant bits of register 2.

Next, the bits corresponding to fields B and D are masked by instruction 3 so that only the bits corresponding to the C field are accessible. Then, register 3 is shifted (SHIFT) 8 bits to the left so that the extracted bits corresponding to the C field are placed at the beginning of register 3, corresponding to the least significant bits. To extract field D, register 1 is shifted 12 bits to the left by instruction 5 so that field C is at the beginning of register 4 corresponding to the positions for the least significant bits. Then at instruction 6, all the bits except the bits corresponding to field D are masked so that only those bits remain in the positions corresponding to the least significant bits of register 4 and there is no need to mask any bits for the register formation in this example. It should be noted that the order of the shift and mask steps in instructions 5 and 6 are reversed from instructions 3 and 4 to show that it does not matter whether the software first masks then shifts or first shifts and then masks.

The software shift and mask technique described above generally requires execution of at least two instructions to extract each field. Often times, additional instructions are performed for each extracted field because extra bits are added when a modification is made to the format of the header, i.e., the standards for the header fields change. The additional instructions increase the time taken to extract each field and thereby slow the process.

The additional instructions typically comprise at least another read instruction. This is undesirable because a variable amount of time is needed to extract the fields. Also, a read instruction consumes more time than other processing instructions due to the time needed to access a memory which, in turn, adds an additional variable aspect to the field extraction process. Accordingly, even though software field extraction techniques are flexible and able to adapt to changing standards, there is a substantial cost associated with their use resulting from the increased and variable time of the software field extraction.

As the speed of network interfaces increases, the time budgeted for processing each data packet decreases. Presently, the processing time budgeted in high speed interfaces severely restricts the number of software instructions that can be performed to extract fields of the data packet header. When the budgeted time does not allow enough instructions to be executed for completing the extraction, the use of hardware must be maximized so that the operations performed on the data packets may be completed within the budgeted time.

In one known approach for extracting fields from a header, a synchronous hardware circuit is used. Here, bits corresponding to the desired fields are hardwired so that their contents are extracted directly by the hardware. As many fields as desired may be wired so that their bits are all extracted, preferably in one clock cycle. While this hardware solution extracts header bits at high speed, the known hardware mechanisms are not easily modified for evolving header standards since re-wiring must be performed for changes in the fields to be extracted.

As data transmission rates increase, traditional software data manipulation techniques for field extraction cannot guarantee completion within an allotted time. While conventional software field extraction techniques provide flexibility for extracting arbitrary information, known software techniques do not guarantee that all extractions will be performed in a fixed amount of time. As higher speed switches and interfaces are introduced, the extraction time budgeted for each data packet is reduced and a greater need arises for completing the extraction in a fixed amount of time. Also, conventional hardware techniques for field extraction do not provide the necessary flexibility to adapt to the changing standards for header fields. Accordingly, a solution to field extraction is desirable that allows high speed interfaces to be developed that can be readily modified to evolving standards of the header fields.

SUMMARY OF THE INVENTION

The invention relates to a system for quickly extracting information from arbitrary fields of a packet transferred among entities of a computer network. The system comprises a field extractor having synchronously operated hardware circuitry that is programmable to extract the contents of a field from the packet and then to interpret these extracted contents. Notably, the programmable hardware-based field extraction system extracts the contents of a field within a fixed amount of time while also providing the flexibility needed to adapt to changing header standards so that information can be extracted from arbitrary fields of, e.g., a header of the packet.

In an illustrative embodiment, the novel extraction system comprises an application specific integrated circuit (ASIC) for receiving a data packet from the network. The ASIC includes a memory or buffer for storing desired information from the received data packet. The memory may store information corresponding to any bit location that may be extracted and interpreted. Preferably, the memory is of sufficient capacity to store a maximum number of bits in the header in addition to extra bits so as to provide flexibility for future changes in size of the header. The ASIC further comprises a programmable bit selector circuit for selecting a single bit, all of the bits for a field, or combinations thereof during a single clock cycle of the system. Each selected bit or bits are then stored in a result register of the ASIC.

Specifically, the extraction system comprises a multiplexer having inputs that are hardwired to a memory corresponding to selected bit locations of a received data packet. The programmable bit selector circuit is connected to the multiplexer and comprises a bit number register or table which stores entries corresponding to the bit locations in the memory for the selected bits. The bits are selected one bit or one group of bits at a time in any sequence and then stored in the result register. Accordingly, a single bit is extracted and stored in the result register within one clock cycle of the system and N-bits are extracted and stored in the result register within N clock cycles of the system. This allows the extraction of bits from a field to be completed in a constant amount of time for each received data packet.

Once the selected information has been extracted, a field interpretation process is initiated to determine how the data packet is handled. It is advantageous to extract only the minimum number of bits needed to perform field interpretation. Therefore, the field extraction process provides only the necessary fields at an expected position and size so as to optimize the process. The field extraction and interpretation process cooperate to reduce the complexity of the field interpretation process.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

In the field extraction system and method according to the embodiments of the present invention, the field extraction of data packets transmitted within a data communications network advantageously combines aspects of hardware and software within an entity of the network so that information may be extracted from arbitrary fields of, e.g., a header of a packet within a fixed and known amount of time. The entity may comprise a router configured to read and interpret the fields of the data packets prior to forwarding the packet to a destination. The router generally comprises a plurality of modules, such as processor, memory and input/output port modules, interconnected by a bus.

Even though the field extraction techniques of the novel system and method are hardware based, the necessary flexibility is retained by software techniques for adapting to the changes in header standards that change with great frequency as the use of data communications networks evolve. The novel extraction system and method are well-suited to ASIC implementations and allow higher speed interfaces to be realized as compared to interfaces performed by software techniques alone. Furthermore, interfaces which utilize the novel extraction system and method can be easily modified in response to changing standards as compared to conventional systems utilizing fixed hardware mechanisms.

Figures 1, 2:
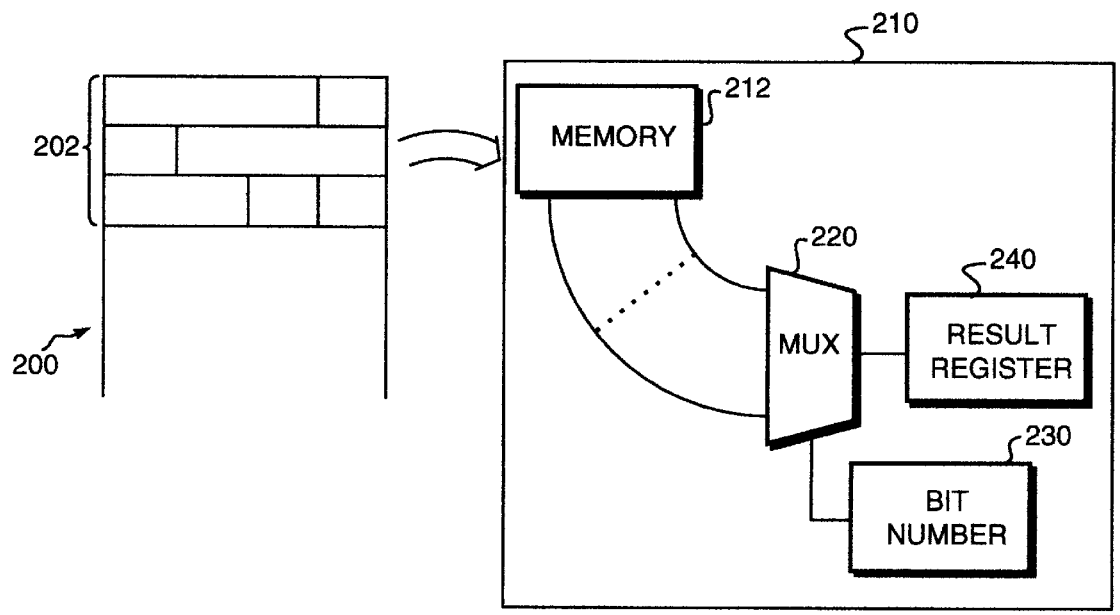
FIG. 1 is a schematic diagram of an illustrative data packet that may be used in a data communications network.
FIG. 2 is a block diagram of a system for extracting a single arbitrary bit according to an embodiment of the present invention.

FIG. 2 illustrates one embodiment of the present invention for extracting a single arbitrary bit from a data packet header. In FIG. 2, the data packet 200 includes a header 202 having a plurality of header fields. The first step performed by the field extraction preferably stores the entire header 202 in addition to extra bits, i.e., a portion of the data packet, into a memory 212 of an ASIC 210 so that all of the potential locations for holding a bit to be extracted are made available to the ASIC 210. Notably, the additional bits are stored in the memory in the event that they may be later used if the header size is increased. The outputs of the memory 212 corresponding to these bit locations are hardwired to a multiplexer 220 of the ASIC 210.

The multiplexer 220 is connected to a programmable bit number processor 230 which enables the multiplexer 220 to select one of the bits of the header 202 from the memory 212. In exemplary embodiments, the bit number processor 230 may be a register or a single entry table. The bit number processor 230 is typically programmed when the ASIC 210 is initialized with entries corresponding to the desired bit location to be extracted. The bit number processor 230 can later be easily re-programmed to extract new bit locations stored in the memory 212 if the standards for the bit locations ever change or a need arises. The selected bits are then stored in a result register 240.

The one bit field extraction according to the present embodiment is performed in a constant amount of time, i.e., within one clock cycle. This time is independent from the location of the bit within in the header 202. It is assumed that the propagation delay of the multiplexer 220 is fast enough to ensure that the result register 240 is loaded within one clock cycle after the bit becomes available. As a result, an arbitrary bit of the header 202 may be extracted by an operation of one cycle operation.

Figure 3:
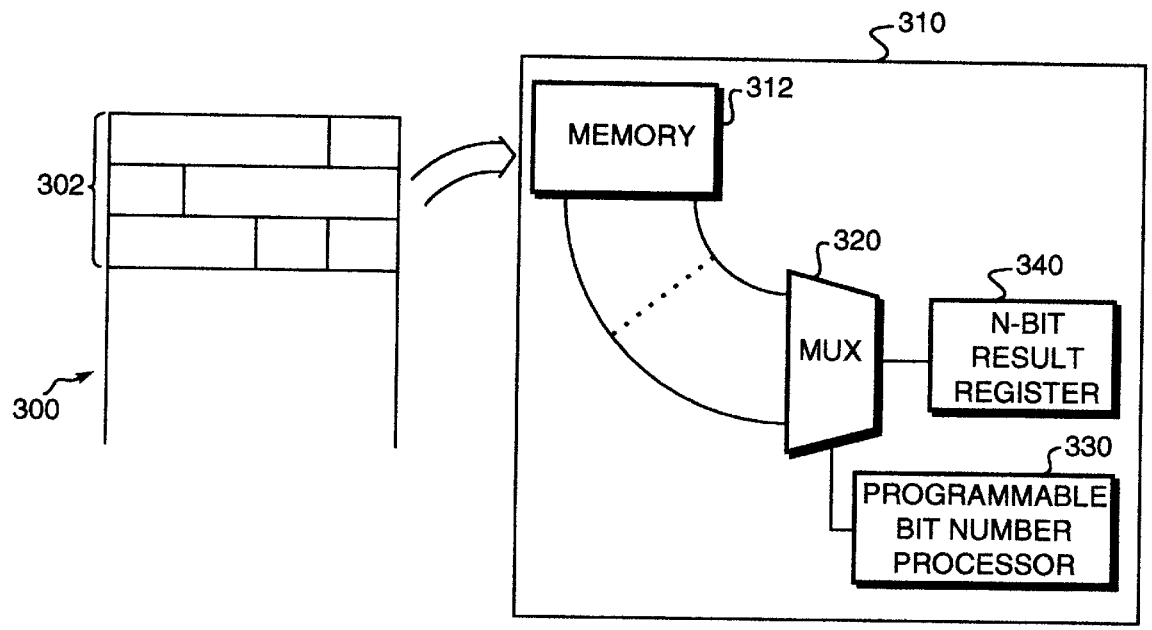
FIG. 3 is a block diagram of a system for extracting an arbitrary set of fields totaling N-bits in N-clock cycles according to an embodiment of the present invention.

Another embodiment of the present invention is illustrated in FIG. 3 for a system which extracts a set of fields totaling N bits. The N bits may form a single, contiguous N bit field or a combination of various sized fields totaling N bits. Similar to FIG. 2, a data packet 300 including a header field 302 is stored in a memory 312 of an ASIC 310. The outputs of the memory 312 corresponding to the locations of bits in the header 302 that are desired to be extracted are hardwired to a multiplexer 320. A programmable bit number processor 330 is connected to the multiplexer 320. In this embodiment, the bit number processor 330 may be a table having N-entries corresponding to the desired bits to be extracted. The bit number processor 330 may also comprise a sequencer for advancing to the next entry of the table after each clock cycle. The output of the multiplexer 320 is connected to a result register 340. The result register may be an N-bit shift register which stores and shifts each extracted bit until the process is completed in N clock cycles.

In the first clock cycle after the header 302 is stored in the memory 312, the first entry of the bit number processor 330 selects a bit from the header 302 and places the bit in the first location of the result register 340. In the second clock cycle, the first bit is shifted to the second location of the result register 340 and the second entry of the bit number processor 330 is selected so that the second extracted bit from the header 302 is stored in the first location of the result register 340. This process continues for a total of N clock cycles until all of the N bits are extracted. At this time, the N bit result register 340 has extracted the programmed sequence by the bit number processor. This process is completed in a fixed amount of time (in N clock cycles), regardless of the locations of the bits extracted so that N-bits are extracted within N clock cycles.

In order to reduce the amount of time necessary to extract N bits, performance trade off may be made with respect to the gate count of the system and the resolution of the bits to be extracted. The resolution of the extracted bits refers to groups of bit locations supported by the system. For instance, if there is a high probability that a given field will always terminate on a four-bit (nybble) boundary, this assumption can be used to optimize the performance for an implementation. If this assumption is made, the bit resolution is reduced from a bit to a nybble alignment.

In the example illustrated in FIG. 3, N-bits are extracted in N clock cycles, which reduces gate count and performance while retaining the maximum amount of resolution (a bit level resolution). If it is desired to retain the bit level resolution when extracting N bits, the field extraction time may be reduced from N clock cycles to N/T clock cycles where T is the number of parallel instances of the bit number processor, the multiplexer and the result register on an ASIC. Each result register and bit number processor are reduced to N/T in both of these cases but the multiplexer is fully replicated for the maximum resolution case which increases the necessary area. By increasing the parallel instances of these gates on the ASIC, the performance is increased by a factor of T. However, this performance enhancement is realized at a cost which increases the complexity of the ASIC by multiplying the gate count by a factor of almost T.

Another approach for improving the performance and gate count of the system is to change the resolution from a bit level resolution to a resolution for groups of B bits. The groups of B bits to be extracted are hardwired in the system. Such a grouping of bits increases the number of extracted bits per cycle by a factor of B. However, all of the extracted bits must have their alignment fixed at B bits and it is not possible to change the alignment by software in response to future changes in header standards as these groupings of bits are hardwired.

Figure 4:
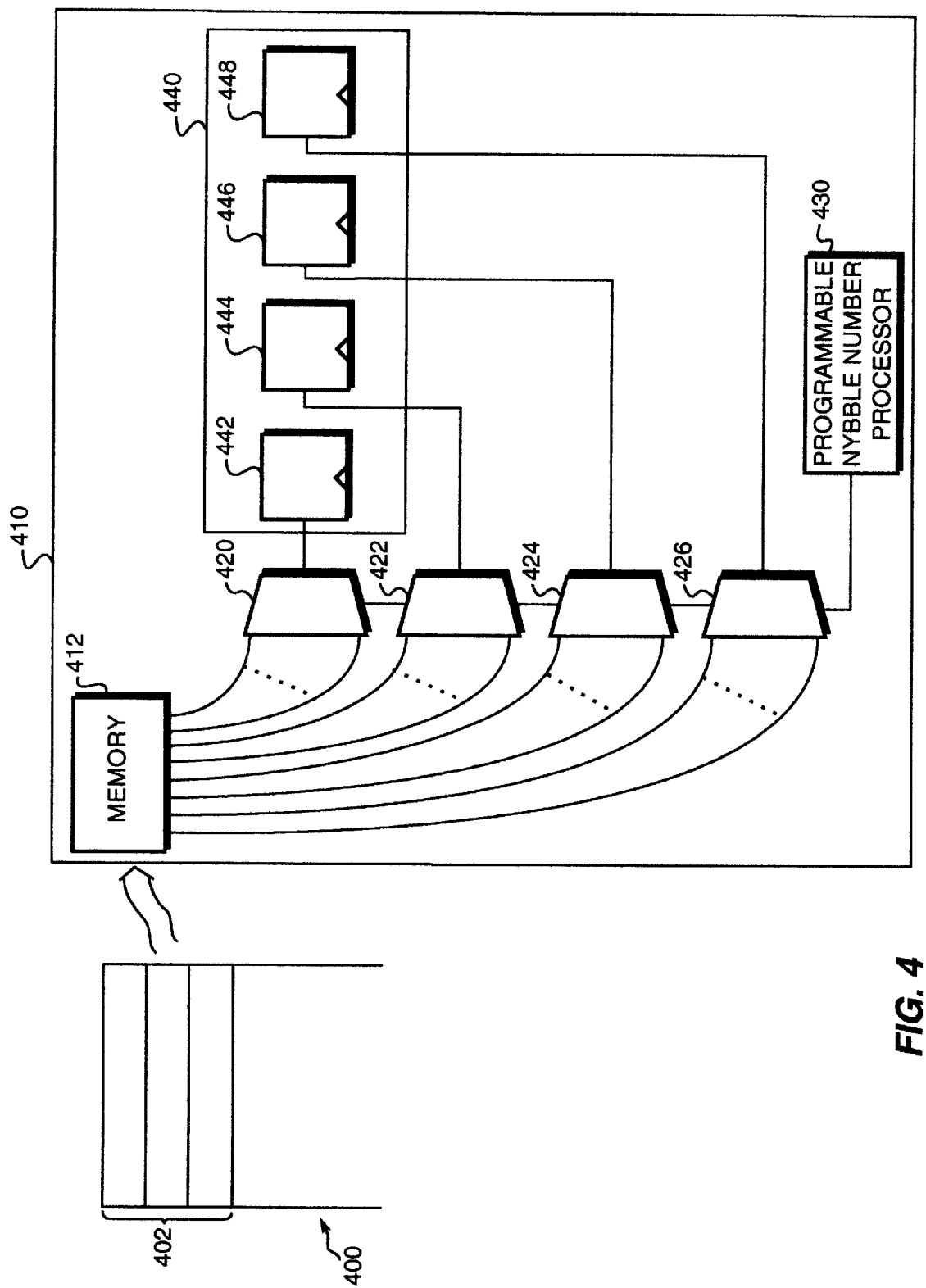
FIG. 4 is a block diagram of a system for extracting an arbitrary set of fields totaling N-nybbles according to an embodiment of the present invention.

In FIG. 4, an embodiment of the present invention is illustrated for a single bit number processor and result register, i.e., T=1, and for a group of 4 bits (a nybble resolution), i.e., B=4. In FIG. 4, a data packet 400 includes a header 402. The bits of the header 402 are stored in a memory 412 of an ASIC 410. The locations of the bits are connected to multiplexers 420, 422, 424 and 426 so that a nybble (aligned to a nybble boundary) may be extracted within a single clock cycle. A nybble number processor 430 is connected to the multiplexers 420, 422, 424, and 426 so that 4 bits are selected during each clock cycle where the multiplexers each select a predetermined bit of the nybble boundary. For instance, the first multiplexer 420 may select the LSB of the nybble, the second multiplexers 422 and 424 may select the next significant bits of the nybble, and the fourth multiplexer 426 may select the MSB of the nybble. Preferably, the configuration of the bit number processor 430 is similar to the processor used in the embodiment of FIG. 3 in that a table of entries and a sequencer are utilized. The only difference is that the number of table entries in the present embodiment is reduced in number by $\log_2(B)$ to the number of nybbles to be extracted. The multiplexers are connected to a result register 440 which includes shift registers 442, 444, 446, and 448 corresponding to each bit selected in the nybble boundary.

The above described techniques for trading off performance, gate count and field resolution may be combined to optimize the entire system. For example, in a system with a fixed maximum time to handle a packet and a set of assumptions about the resolution required for each field, one or more field extractors (T≧2) may be designed to minimize the gate count. In a high performance situation, it may be advantageous to build 2 or more field extractors with different resolutions. Thereby, the contents of small fields with arbitrary alignments, such as control mode bits, may be collected with a bit resolution field extractor and larger fields, which can be reasonably expected to have much coarser resolutions, could be collected with a lower resolution but by a faster field extractor. Furthermore, the contents of other fields could be directly extracted in hardware without any programmable position.

Arbitrary header bits may be included in a number of extracted fields such that the fields overlap. In these cases, a header bit position may have multiple meanings depending on subsequent header processing with the bit being included in multiple fields for subsequent selection and usage. Thereby, it may be helpful to have a constant 0 or a constant 1 on inputs of the multiplexer. This can be subsequently used to make a new field definition compatible with older hardware. For instance, if a 1-bit field is extracted and used to select an option in hardware-based header processing that is performed after field extraction, this mode bit may be deleted and recycled for future use. By having a constant 1 or a constant 0 at the input, the field extractor could be programmed to put a constant into the position of the result register so that the downstream hardware is isolated from this change.

Figure 5A:
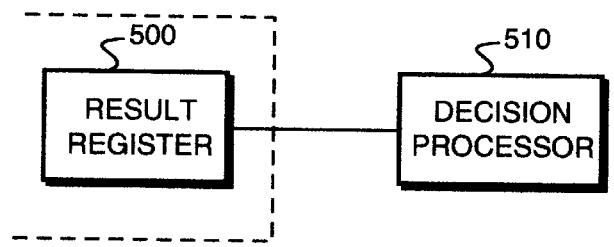
FIGS. 5(a) and 5(b) are block diagrams illustrating systems for interpreting the extracted fields according to embodiments of the present invention.
Figure 5B:
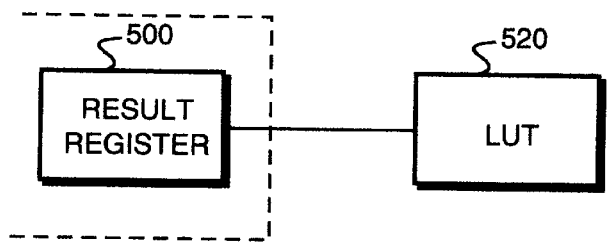

Once the contents of fields are extracted, those contents must be interpreted and processed so that the data packet may be properly sent to the next entity of the network. The interpretation and processing may be performed by field interpreters, such as processors and lookup tables, connected to the result register. For instance, FIG. 5(a) illustrates a result register 500 having the contents of extracted fields stored therein connected to a decision processor 510 and FIG. 5(b) illustrates the result register 500 connected to a lookup table (LUT) 520. To accurately perform field interpretation, the decision processor 510 and the lookup table 520 rely on the contents of an extracted field to be of an expected location and size. Therefore, it is critical for the field extraction to adapt to any changes in header standards. Furthermore, by extracting the minimum number of field contents necessary to perform the field interpretation, the complexity of the decision processor 510 or the lookup table 520 can be significantly reduced.

For instance, the lookup table 520 may simply be a random access memory (RAM) which is addressed by portions of the result register 500. The output of the lookup table 520 may be any number of control field contents which describe the exact function that the networking equipment should perform to the data packet. The RAM and the result register can evaluate any sequence of conditions from the header as long as the number of bits examined is less than or equal to the size of the result register 500. Similar to the field extraction, the RAM will complete the interpretation within a fixed amount of time, often within one cycle after the field extraction is completed. However, because RAM blocks for evaluating the contents of control fields grow quickly, only simple applications are able to afford fully general single table approaches and more complex applications will require multi-level evaluation. For example, a multi-level RAM with inputs from other hardware, which examines large fields by extracting limited information, may be used to reduce the RAM size. This technique can generally be accomplished within a few clock cycles after the field interpretation so that a constant time field interpretation at a high speed can be realized.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system for extracting information from arbitrary fields of data packets transferred among entities of a data communications network, the system comprising:

a memory for storing contents of the data packets;

a multiplexer connected to the memory for selecting contents of predetermined fields from the arbitrary fields of the data packets stored in the memory;

a bit number processor connected to the multiplexer for programmably setting entries corresponding to the predetermined fields selected by the multiplexer; and a result register for storing the selected contents of the predetermined fields in response to the bit number processor.

2. The system according to claim 1 wherein the predetermined fields comprise headers of the data packets.

3. The system according to claim 2 wherein the contents of the data packets comprise a portion of the data packets.

4. The system according to claim 3 wherein the portion of the data packets comprise a header and additional bits.

5. The system according to claim 2 wherein the contents of the data packets comprises the entire data packet.

6. The system according to claim 1 further comprising a field interpreter for interpreting the selected contents of the predetermined fields.

7. The system according to claim 6 wherein the field interpreter comprises a decision processor.

8. The system according to claim 6 wherein the field interpreter comprises a look up table.

9. The system according to claim 8 wherein the look up table is a random access memory having control field contents describing functions performed on the data packets.

10. The system according to claim 8 wherein the look up table is a multi-level random access memory having multiple inputs.

11. The system according to claim 1 wherein the bit number processor is programmed to select one bit of the predetermined fields.

12. The system according to claim 1 wherein the bit number processor is programmed to select a plurality of B-bits of the predetermined fields wherein B represents a grouping of bits.

13. The system according to claim 12 wherein the bit number processor comprises a table of N entries and a sequencer for programmably setting the plurality of B-bits.

14. The system according to claim 13 wherein the result register comprises an B-bit parallel shift register.

15. The system according to claim 1 wherein the data packets stored in the memory are transferred between modules across an interface.

16. The system according to claim 15 wherein the interface is a bus.

17. A method for extracting information from arbitrary fields of data packets transferred among entities of a data communications network, the method comprising the steps of:

(a) storing contents of the data packets received from the network in a memory;

(b) selecting the contents of predetermined fields from the arbitrary fields of the data packets stored at the step (a);

(c) programmably setting entries corresponding to the predetermined fields selected at the step (b); and (d) storing the contents of the predetermined fields selected at the step (b) in response to the programmable setting at the step (c).

18. The method according to claim 17 wherein the predetermined fields comprise headers of the data packets.

19. The method according to claim 18 further comprising the step of interpreting the selected contents of the predetermined fields using a field interpreter.

20. The method according to claim 19 wherein the step of interpreting comprises the step of describing functions performed on the data packets.

21. The method according to claim 19 wherein the step of interpreting comprises completing interpretation within a fixed amount of time.

22. The method according to claim 17 wherein the step (c) of programmably setting comprises the step of programmably extracting one bit of the predetermined fields.

23. The method according to claim 17 wherein the step (c) of programmably setting comprises the step of programmably extracting a plurality of B-bits of the predetermined fields wherein B represents a grouping of bits.

* * * * *